July 7, 1936.  W. M. GETTYS  2,047,024
POWER TAKE-OFF DEVICE
Filed Sept. 23, 1935
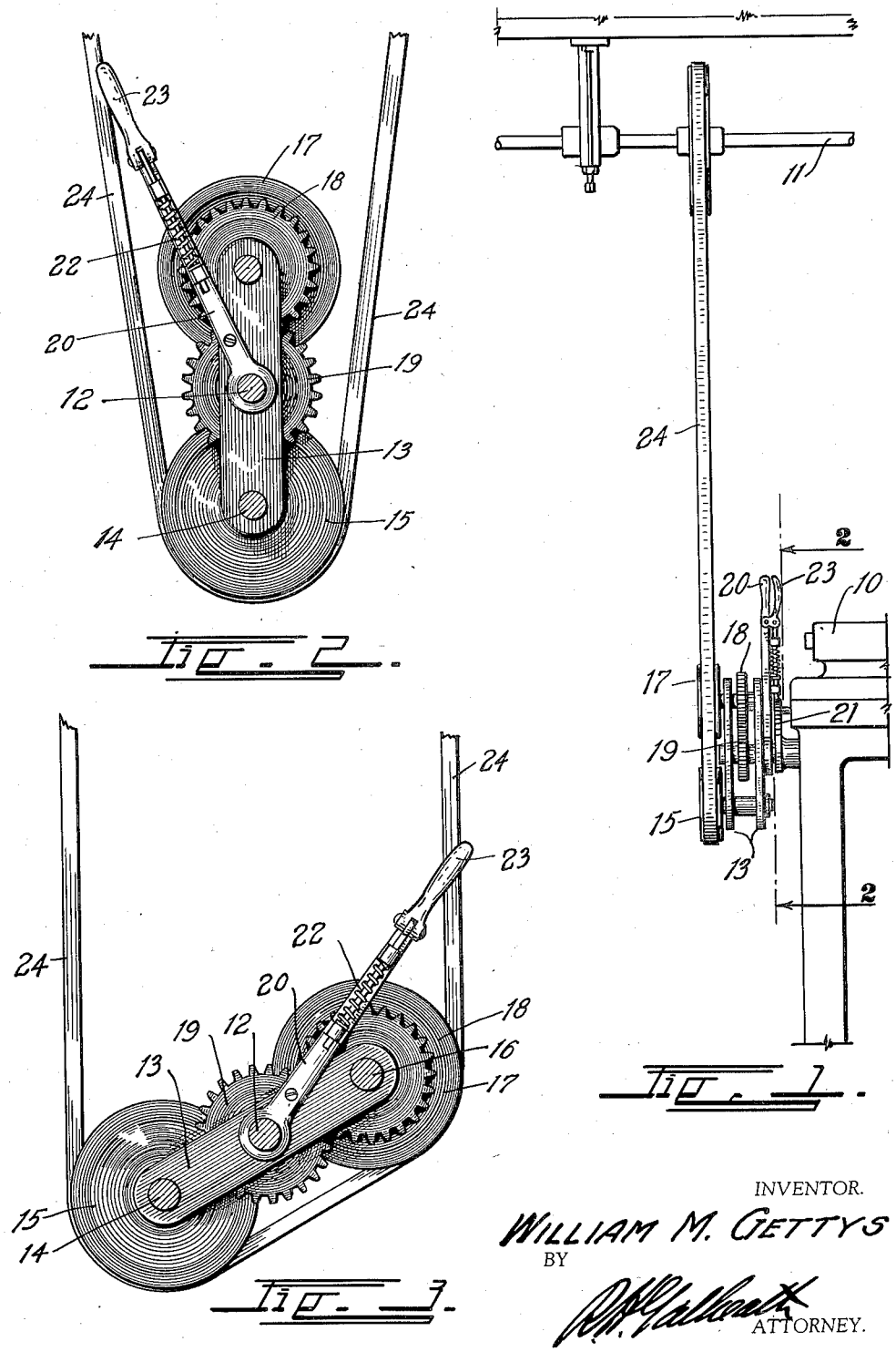
INVENTOR.
WILLIAM M. GETTYS
BY
ATTORNEY.

Patented July 7, 1936

2,047,024

UNITED STATES PATENT OFFICE 2,047,024

POWER TAKE-OFF DEVICE

William M. Gettys, Greeley, Colo.

Application September 23, 1935, Serial No. 41,678

8 Claims. (Cl. 74—221)

This invention relates to a power transmission and control, or take-off device for belt driven machines. V-belts are known to be one of the most efficient of power transmitting means. Such belts, however, do not admit of being changed from "tight" to "loose" pulleys, as is usual in driving belt driven machines which require constant stopping and starting. For this reason, expensive and complicated clutches have been necessary in the transmission of power to machines by means of V-belts. The cost of such clutches has been a serious handicap to the universal use of the desirable V-belts.

The principal object of this invention is to provide a power take-off device to be used in transmitting power to any desired machine by means of a V-belt which will allow the machine to be connected with, or disconnected from, a travelling V-belt, at will, without requiring belt shifting devices, clutches, etc.

The invention is more particularly designed as an improvement upon the device illustrated in applicant's copending application, Serial No. 747,003, now Patent No. 2,024,213. The prior construction was designed for transmitting power by means of a V-belt to a movable, flexible shaft. The present invention is more particularly designed for transmitting power from a V-belt to a fixed driven shaft.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates the invention applied to the transmission of a power from a line shaft to a machine tool by means of a V-belt.

Fig. 2 is an enlarged section taken on the line 2—2, Fig. 1, illustrating the invention in the "off" or "idling" position.

Fig. 3 is a similar view illustrating the mechanism in the "on" or "driving" position.

In the drawing, a typical power driven tool or machine is indicated at 10. This indication is simply illustrative, as the mechanism at 10 could be anything to be driven from power. A typical line shaft is indicated at 11 from which power is to be supplied to the machine 10. The line shaft 10 is also illustrative since this could be any driving mechanism such as a motor, engine, or other power supplying mechanism.

The invention comprises a driven shaft 12 which projects from and furnishes the power to the machine 10. A yoke 13, preferably, but not necessarily, consisting of two side plates, is mounted upon the shaft 12 so that it may be freely rotated or rocked thereon. At one extremity of the yoke 13, an idler shaft 14 carrying a V-belt idler pulley 15 is mounted. At the other extremity of the yoke 13 a power shaft 16 is journalled. The power shaft 16 carries a V-belt, power pulley 17, keyed or otherwise secured thereon. A driving gear 18 is also secured to the work shaft 16 or to the power pulley 17 which meshes with a driven gear 19 secured on the driven shaft 12 within the yoke 13. Equivalent means could be employed for transmitting the power from the power shaft 16 to the driven shaft 12, such as sprockets, chains, belts, etc.

By swinging the yoke 13 about the driven shaft 12, the power pulley 17 can be brought into or out of contact with the belt 24. This swinging does not in any way interfere with the tension of the belt since as the work pulley contacts therewith, the idler pulley 15 will swing inwardly to release the tension therein.

Thus, it can be readily seen that when it is desired to have power delivered to the driven apparatus 10, it is only necessary to swing the yoke 13 to bring the power pulley 17 into contact with the belt 24. The wedging action of the V-type of belt will readily transmit the power therefrom to the power pulley, thence through the transmission gears 18 and 19 to the work shaft 12.

When it is desired to disconnect the driven apparatus, it is only necessary to swing the yoke to the position of Fig. 2, which will allow the power pulley 17 to come to rest while the idler pulley 15 carries the movement of the belt 24.

Any suitable means may be provided for swinging the yoke 13, and any suitable means may be provided for locking the yoke in either or both of its extreme positions.

As illustrated, the yoke is attached to a control lever 20 convenient to the hand of the operator. The control lever is provided with a latch 23, actuated by means of a spring 22, which coacts with a notched, fixed segment 21 supported from the driven apparatus 10. With this construction, the operator can readily swing the yoke from the position of Fig. 2 to that of Fig. 3 or vice versa. He can also lock the yoke in any desired position by means of the latch 23.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A power takeoff for a belt driven machine comprising: a driven shaft operatively connected with said machine; a bearing member pivotally supported so that it may be moved about the axis of said driven shaft; an idler pulley supported by said bearing member to one side of said driven shaft; a power pulley supported by said bearing member eccentrically of said driven shaft; a driving belt extending about said idler pulley; means for swinging said bearing member so as to bring said power pulley into or out of contact with said belt; and means for transmitting power from said power pulley to said driven shaft.

2. A power takeoff for a belt driven machine comprising: a driven shaft operatively connected with said machine; a yoke free to rotate about said driven shaft; an idler pulley mounted on said yoke at one side of said driven shaft; a driving belt extending about said idler pulley; a power shaft journalled in said yoke on the other side of said driven shaft; a power pulley carried by said power shaft; a gear fixedly connected to said power shaft; and a coacting gear fixedly connected to said driven shaft and meshing with said first gear; and means for swinging said yoke so as to bring said power pulley into contact with said belt when desired.

3. A power take-off for a belt driven machine comprising: a driven shaft operatively connected with said machine; a yoke free to rotate about said driven shaft; an idler pulley mounted on said yoke at one side of said driven shaft; a driving belt extending about said idler pulley; a power shaft journalled in said yoke on the other side of said driven shaft; a power pulley carried by said power shaft; a gear fixedly connected to said power shaft; and a coacting gear fixedly connected to said driven shaft and meshing with said first gear; means for swinging said yoke so as to bring said power pulley into contact with said belt when desired; and means for holding said yoke in a predetermined position.

4. A power takeoff for a belt driven machine comprising: a driven shaft operatively connected with said machine; a yoke free to rotate about said driven shaft; an idler pulley mounted on said yoke at one side of said driven shaft; a driving belt extending about said idler pulley; a power shaft journalled in said yoke on the other side of said driven shaft; a power pulley carried by said power shaft; a gear fixedly connected to said power shaft; and a coacting gear fixedly connected to said driven shaft and meshing with said first gear; and a lever projecting from said yoke for swinging the latter to bring said power pulley in contact with said belt when desired.

5. A power takeoff for a belt driven machine comprising: a driven shaft operatively connected with said machine; a yoke free to rotate about said driven shaft; an idler pulley mounted on said yoke at one side of said driven shaft; a driving belt extending about said idler pulley; a power shaft journalled in said yoke on the other side of said driven shaft; a power pulley carried by said power shaft; a gear fixedly connected to said power shaft; and a coacting gear fixedly connected to said driven shaft and meshing with said first gear; a lever projecting from said yoke for swinging the latter to bring said power pulley in contact with said belt when desired; and means for locking said lever at the extremity of its movement.

6. A power takeoff for a belt driven machine comprising: a driven shaft operatively connected with said machine; a yoke free to rotate about said driven shaft; an idler pulley mounted on said yoke at one side of said driven shaft; a driving belt extending about said idler pulley; a power shaft journalled in said yoke on the other side of said driven shaft; a power pulley carried by said power shaft; a gear fixedly connected to said power shaft; and a coacting gear fixedly connected to said driven shaft and meshing with said first gear; and a lever projecting from said yoke for swinging the latter to bring said power pulley in contact with said belt when desired; a latch carried by said lever; and means for engaging said latch to lock said yoke at the extremity of its movement.

7. A power take-off for a V-belt driven machine comprising: a driven shaft to said machine; a bearing member journalled on said driven shaft; an idler shaft supported at one extremity of said bearing member; a power shaft supporting at the other extremity of said bearing member, said idler and power shafts being equi-distant from the axis of said driven shaft; a first V-belt pulley mounted on said idler shaft; a second V-belt pulley secured on said power shaft; a gear secured on said power shaft; a driven gear secured on said driven shaft, said two gears meshing with each other; a V-belt surrounding said bearing member and riding continuously over said idler pulley; and means for swinging said bearing member so as to bring said power pulley into contact with said belt when desired.

8. Means for transmitting power from a driving pulley to a driver shaft comprising: a yoke mounted on and arranged to rotate about said driven shaft, an idler pulley carried by said yoke at one side of said driven shaft; a power pulley carried by said yoke at the other side of said driven shaft; a belt extending around said driving pulley and around said idler pulley; means for transmitting power from said power pulley to said driven shaft; and means for swinging said yoke so as to bring said power pulley into contact with said belt when desired, while said idler pulley remains continuously in contact therewith.

WILLIAM M. GETTYS.